(12) United States Patent
Ahmed et al.

(10) Patent No.: US 7,956,688 B2
(45) Date of Patent: Jun. 7, 2011

(54) COMMON MODE CANCELLATION IN DIFFERENTIAL NETWORKS

(75) Inventors: Rubina F. Ahmed, Cary, NC (US); Bradley D. Herrman, Cary, NC (US); Pravin Patel, Cary, NC (US); Peter R. Seidel, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 58 days.

(21) Appl. No.: 12/574,923

(22) Filed: Oct. 7, 2009

(65) Prior Publication Data

US 2011/0080973 A1 Apr. 7, 2011

(51) Int. Cl.
*H03F 3/45* (2006.01)
*H03K 19/094* (2006.01)

(52) U.S. Cl. ............ 330/254; 330/258; 326/82; 326/84; 326/86

(58) Field of Classification Search .......... 330/252–254, 330/255, 258, 260; 326/62, 82–84, 86, 89–90, 326/115, 119, 121, 126, 127; 327/108
See application file for complete search history.

(56) References Cited

U.S. PATENT DOCUMENTS

| | | | | |
|---|---|---|---|---|
| 5,166,635 A | * | 11/1992 | Shih | 330/253 |
| 5,281,924 A | * | 1/1994 | Maloberti et al. | 330/253 |
| 5,796,301 A | * | 8/1998 | Tanabe et al. | 330/9 |
| 5,990,737 A | * | 11/1999 | Czarnul et al. | 330/69 |
| 6,865,382 B2 | * | 3/2005 | Behzad | 455/323 |
| 6,891,435 B2 | * | 5/2005 | Patel et al. | 330/254 |
| 6,958,653 B2 | * | 10/2005 | Vaara et al. | 330/256 |
| 7,088,179 B2 | * | 8/2006 | Gilbert et al. | 330/254 |
| 7,113,121 B1 | * | 9/2006 | Sutardja et al. | 341/144 |
| 7,215,148 B1 | * | 5/2007 | Johnson et al. | 326/83 |
| 7,248,079 B2 | * | 7/2007 | Bhattacharya et al. | 326/83 |
| 7,271,651 B2 | * | 9/2007 | Chen et al. | 330/253 |
| 7,295,068 B2 | * | 11/2007 | Capofreddi et al. | 330/254 |
| 7,298,837 B2 | * | 11/2007 | Patterson | 379/399.01 |
| 7,508,235 B2 | * | 3/2009 | Singor | 326/82 |
| 7,535,258 B1 | * | 5/2009 | Johnson et al. | 326/82 |
| 7,609,097 B2 | * | 10/2009 | Leonowich et al. | 327/108 |
| 7,831,234 B2 | * | 11/2010 | Schelmbauer et al. | 455/323 |
| 7,855,576 B1 | * | 12/2010 | Luo et al. | 326/82 |
| 2003/0085737 A1 | * | 5/2003 | Tinsley et al. | 326/86 |
| 2005/0285629 A1 | * | 12/2005 | Hein et al. | 326/115 |
| 2006/0006912 A1 | * | 1/2006 | Leonowich et al. | 327/112 |
| 2007/0115030 A1 | * | 5/2007 | Bhattacharya et al. | 326/83 |
| 2007/0285128 A1 | * | 12/2007 | Singor | 326/82 |
| 2009/0140778 A1 | * | 6/2009 | Kikuchi et al. | 327/108 |

* cited by examiner

*Primary Examiner* — Rexford N Barnie
*Assistant Examiner* — Matthew C Tabler
(74) *Attorney, Agent, or Firm* — Cynthia G. Seal; Jeffrey L. Streets

(57) ABSTRACT

Embodiments of the invention include a common mode cancellation circuit and method for correcting signal skew in a differential circuit. According to one embodiment, an op amp circuit is used to correct the mismatch between transmission line lengths in the differential circuit. The CMCC can be embodied as an ASIC and added on to an existing differential signaling systems to correct and compensate for board wiring skew or other causes of phase misalignment. The result is restoration of the cross-over intersection of the plus and minus signals of the differential pair closer to the common voltage level point, as if the signals had been in phase.

10 Claims, 4 Drawing Sheets

COMMON MODE CANCELLATION IN DIFFERENTIAL NETWORKS

BACKGROUND OF THE INVENTION

1. Field of the Invention

The present invention relates to differential signaling systems, and more specifically to correcting for signal mismatch.

2. Background of the Related Art

Components of computer systems communicate along signal paths, such as along electrical traces etched on a circuit board substrate and conductors in electrical connectors. Electronic signals are typically generated as an analog or digital waveform comprising a fluctuating voltage. Signals can be transmitted using either a single-ended system or a differential system. A single-ended system transmits a signal along one signal path, using a fluctuating voltage that a receiver compares with a fixed reference voltage. A differential signaling system, by comparison, transmits two signals sent on two complementary signal paths. The receiver reads the difference between the two complementary signals, ignoring their voltages with respect to ground.

Single-ended systems and differential systems each have inherent advantages and disadvantages. For example, single-ended signaling systems use higher voltages than differential systems. The comparatively large voltages help filter noise because routine electromagnetic interference is unlikely to induce voltages large enough to be misinterpreted as a signal. However, capacitance and inductance effects filter out high-frequency signals that limit the speed of single-ended systems. By comparison, differential systems can use lower voltages because voltages with respect to ground are ignored. Accordingly, minor changes in ground potential between the driver and receiver do not affect the receiver's ability to detect the signal. Ignoring changes in ground potential gives a differential signaling system twice the noise immunity of a single-ended system. Differential systems also consume less energy as a result of the lower voltages used.

Differential signaling systems can carry higher-frequency (also known as higher-speed) signals. However, higher signal speeds are accompanied by the potential for increased signal mismatch between the complementary signal paths. The higher speeds of modern electronics have led to increasingly stringent length-matching requirements in differential signaling systems. Some older circuit board designs that remain in use, sometimes referred to as "legacy" boards, may not comply with the length matching requirements of newer, higher-speed electronic systems. As a result, some legacy boards are not electrically compatible with newer electronic components, despite being physically plug-compatible. For example, a conventional midplane or backplane, which provides communication paths between components of a server chassis, such as between servers and support modules, may not be capable of handling the upper range of signals speeds that some newer servers are capable of generating.

BRIEF SUMMARY OF THE INVENTION

One embodiment of the present invention provides a differential signaling system. The differential signaling system includes a pair of differential transmission lines of unequal time delay due to conditions such as length mismatch and unbalanced void crossing, unmatched jogs, etc. and having a common mode node between the differential transmission lines. An operational amplifier has a negative input coupled to the common mode node and a positive input coupled to a resistor divider. The resistor divider sets the DC voltage at the positive input equal to a voltage of the common mode node. A pair of transistors is coupled to the output of the operational amplifier. Emitters of the transistors are coupled to the longer of the pair of differential transmission lines, and one of the transistors is reverse-biased.

Another embodiment of the invention provides a method, wherein a differential signal is transmitted over complementary signal paths of unequal length between a driver and a receiver. The method includes resisting a change in crossover voltage of the differential signal at a common mode node between the complementary signal paths near the receiver by automatically injecting electrical current into the common mode node.

DETAILED DESCRIPTION OF THE INVENTION

The present invention provides a novel common mode cancellation circuit ("CMCC") and associated method for correcting signal skew in a differential circuit. According to one embodiment, by configuring an op amp circuit to detect common voltage change from a steady state level and by adjusting the gain of the op amp and the size resistor divider that establish op-amp input levels, transistors in the CMCC can be used to correct for the mismatch between transmission line lengths. The CMCC circuit can be added to an existing differential signaling system to correct and compensate for board wiring skew or other causes of signal phase misalignment. The result is restoration of the cross-over intersection of the positive ("p" or "+") signal and the negative ("n" or "−") signal of the differential pair closer to the common voltage level, as if these two differential signals were in phase.

In one application, the CMCC and associated method can be used to improve the response of a legacy backplane or midplane in a rack-mountable server chassis, some of which include an amount of skew in differential transmission paths that may not be acceptable in current high speed systems. The CMCC could be packaged into a device as an add-on circuit, such as an application-specific integrated circuit (ASIC), that could be externally connected to the differential signal paths having unacceptable skew. Such an application would enable the continued use of legacy systems to provide cost-effective electronic systems that are mix of legacy and newer component designs.

Figure 1:
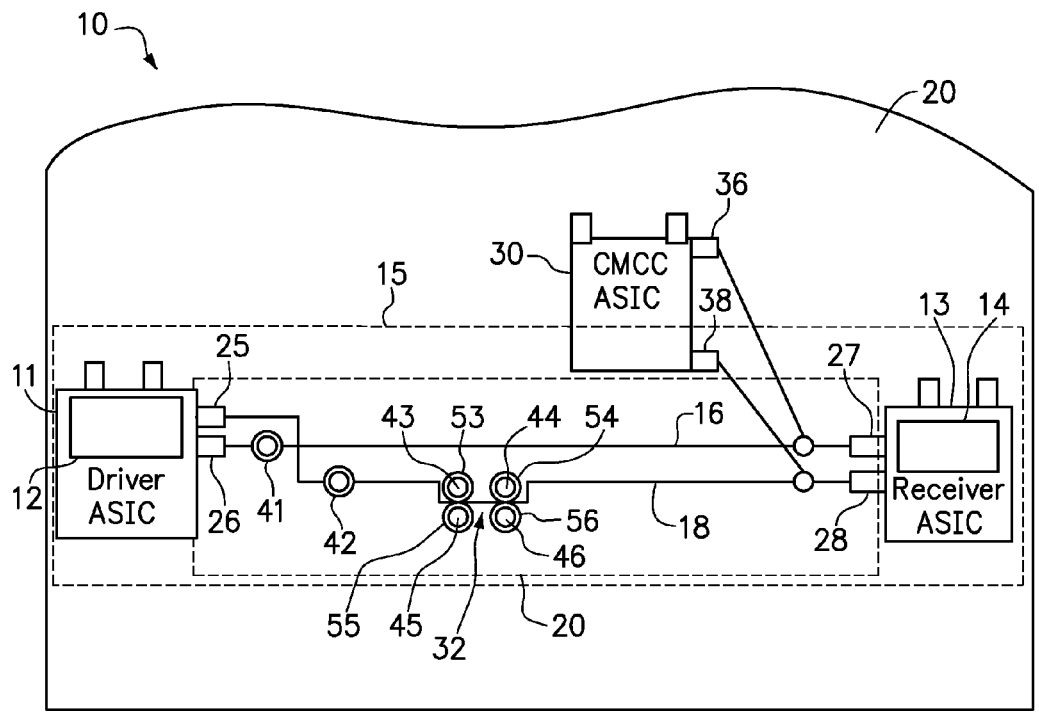
FIG. 1 is a schematic diagram of a high-speed differential signaling system that includes a common mode cancellation circuit coupled to a differential network.

FIG. 1 is a schematic diagram (plan view) of a high-speed differential signaling system 10 that includes a novel common mode cancellation circuit ("CMCC") 30 coupled to a differential network 15 according to an embodiment of the invention. The differential network 15 provides electronic communication between first and second electronic components 11, 13. The driver 12 of the first component 11 is in communication with a receiver 14 of the second component 13 over complementary signal paths 16, 18 (sometimes referred to as a "differential pair") on a legacy circuit board ("legacy board") 20. The complementary signal paths 16, 18 may be embodied as traces on the legacy board 20 that terminate at signal pins 25, 26 on the driver and signal pins 27, 28 on the receiver. The driver 12 generates a differential signal in the form of time-varying voltages at the two signal pins 25, 26. The voltages generated at the signal pins 25, 26 of the driver 12 are communicated along the signal paths 16, 18 to the corresponding signal pins 27, 28 at the receiver 14. The receiver 14 interprets the differential signal as the dynamic voltage difference between the signal pins 27, 28.

In one specific example embodiment, the differential signaling system 10 may be provided in a multi-server computer system chassis (not shown) housing multiple servers and support modules. The first component 11 may be a blade server and the second component 13 may be a management module tasked with managing multiple blade servers. The blade server (component 11) may communicate the occurrence of a blade server fault using the driver 12 to generate a fault signal along the differential signal paths 16, 18. The management module (second component 13) may use the receiver 14 to receive and interpret the fault signal according to the difference in voltage between the signal paths 16, 18.

Signal mismatch or "skew" on complementary signal paths 16, 18 can result in an incorrect reading of the intended voltage difference at the receiver signal pins 27, 28. Several sources of skew are illustrated by way of example in FIG. 1. Some skew is introduced where the signal paths 16, 18 are routed across one another to accommodate the asymmetrical positioning of two vias 41, 42 on the legacy board 20. This routing makes the signal path 18 longer than the signal path 16. Skew can also be introduced by the presence of a jog in a signal path, such as may be designed in the circuit board to avoid obstacles like connector pins or circuit board vias. Here, the signal path 18 includes a jog 32 where the signal path 18 is routed between one pair of vias 43, 44 and another pair of vias 45, 46. The jog 32 further increases the length of the signal path 18. The difference in length between the two complementary signal paths 16, 18 introduce skew because it takes longer for the signal on the longer signal path 18 to reach the receiver 14. Additional skew may also be caused by the signal path 18 crossing in close proximity to the anti-pads 53, 54, 55, 56 of vias 43, 44, 45, 46. An anti-pad is a feature formed by the removal of electrically conductive material on the ground or power plane of a circuit board where a through-hole of the circuit board is not connected to that plane. The skew resulting from these and potentially other sources increases the relative delay between signals reaching the corresponding receiver signal pins 27, 28.

The differential signaling system 10 includes a novel common mode cancellation circuit ("CMCC") 30 to cancel or offset skew between the voltages carried on the complementary signal paths 16, 18. The CMCC includes a first pin 36 connected to one signal path 16 near the receiver 14 and a second pin 38 connected to the other signal path 18 near the receiver 14. The manner in which the CMCC 30 compensates for skew in the complementary signal paths 16, 18 is discussed further below in the context of an example circuit diagram provided in FIG. 3.

Figure 2:
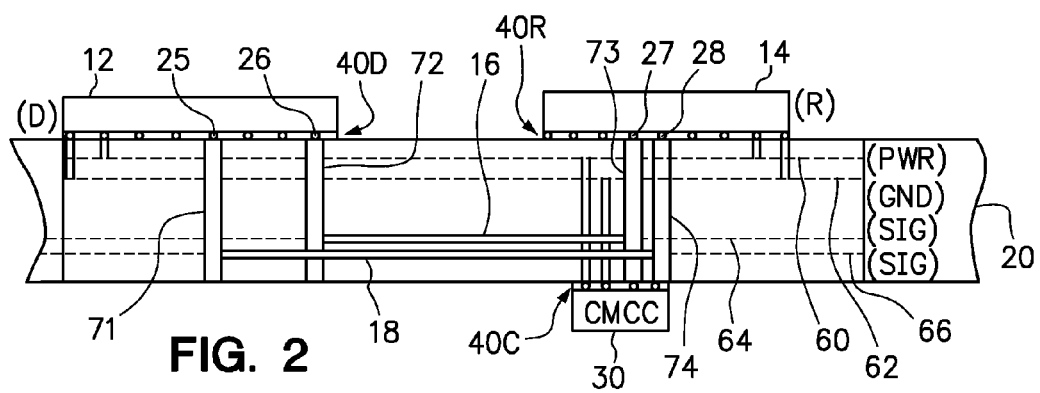
FIG. 2 is a schematic diagram of an example configuration of the differential signaling system of FIG. 1, further detailing an attachment of the driver, receiver, and CMCC to the legacy board.

FIG. 2 is a schematic diagram (side view) of an example configuration of the differential signaling system 10, further detailing an attachment of the driver 12, receiver 14, and CMCC 30 to the legacy board 20. For ease of illustration, the first signal path 16 is shown formed in a first signal plane 64 and the second signal path 18 is shown formed in a second signal plane 68 of the multi-layer legacy board 20, although the two signal paths 16, 18 could alternatively be formed in a common signal plane, or some combination of planes. The driver 12, receiver 14, and CMCC 30 may each be encapsulated in a separate application-specific integrated circuit ("ASIC"). As generally known in the art, an ASIC may be connected to a circuit board using a pin grid array or ball grid array (BGA), where each pin or ball conducts a separate signal from the ASIC to a circuit board. The balls of a BGA and the pins of a pin grid array are analogous in terms of the ability of each ball or pin to carry a separate electrical signal, and the term "pin" may be used in a general sense to refer to the ball of a BGA.

In this example, ball grid arrays 40D, 40R, 40C are used to connect the driver 12, receiver 14, and CMCC 30 to the legacy board 20. The balls of each BGA may be electrically coupled to plated through holes (vias) on the legacy board 20. For example, the driver 12 and receiver 14 are each coupled by vias to a power plane 60, a ground plane 62, and signal planes 64, 66. In particular, one driver signal pin 25 is connected by a via 71 to the signal path 18 and the other driver signal pin 26 is connected by another via 72 to the other signal path 16. Similarly, the receiver signal pin 27 is connected by a via 73 to the signal path 16 and the other receiver signal pin 28 is connected by a via 74 to the signal path 18. Although the signal pins appear to be positioned directly over the vias, the vias are typically positioned outside the BGA and electrically connected to the BGA by circuit board traces. The CMCC 30 is attached to the back side of the legacy board 20 opposite the driver 12 and receiver 14, and is also connected by vias to the power plane 60, the ground plane 62, and the signal planes 64, 66. As shown here, the CMCC 30 uses the same, pre-existing vias as the receiver 14 to be as close as possible to the receiver 14.

Figure 3:
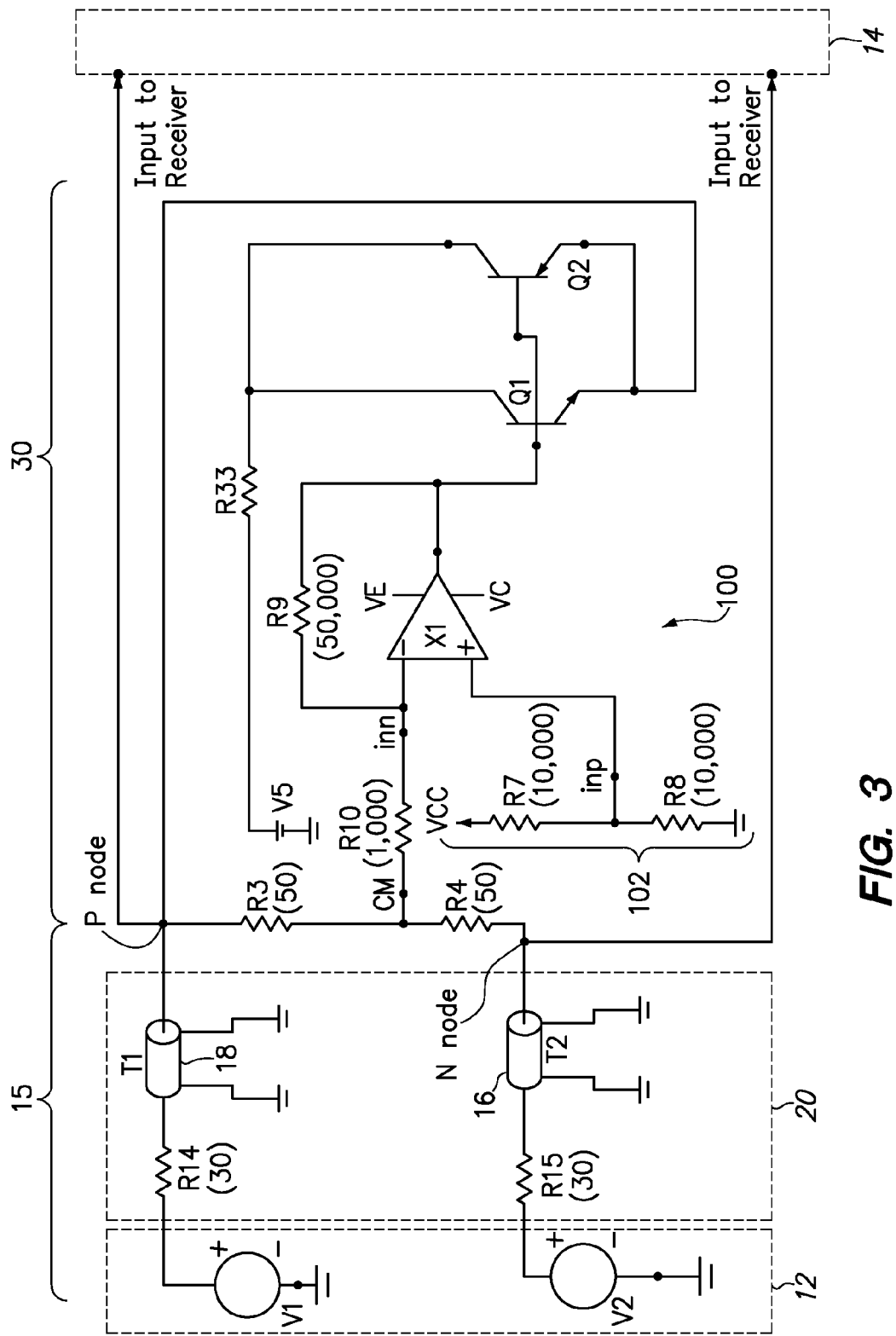
FIG. 3 is a circuit diagram of an embodiment of the CMCC as coupled to a differential network.

FIG. 3 is a circuit diagram of an embodiment of the CMCC 30 as coupled to a differential network. The differential network, while drawn to generally represent any differential network, may be discussed by way of example in the context of the specific differential network 15 of FIG. 1. In FIG. 3, transmission lines T1 (18) and T2 (16) carry signals of a differential pair. In the context of the differential network 15 of FIG. 1, the transmission lines may represent the complementary signal paths 18 and 16, respectively, although path 18 is shown physically longer than path 16. Accordingly, transmission line T1 is longer than transmission line T2 in FIG. 3. The CMCC 30 is a two-port circuit, with a first port coupled to the differential network at a node "P" along the transmission line T1 at a point near the receiver 14 and a second port coupled to the differential network at a node "N" along the transmission line T2 at a point near the receiver 14. The length of each transmission line T1, T2 results in a delayed signal in one of the two transmission lines T1, T2, as measured at the P and N nodes. In this example, the greater length of the first transmission line T1 results in a longer delay at the P node than at the N node. This signal mismatch contributes to skew between differential signals transmitted along transmission lines T1 and T2.

The CMCC 30 forces the crossover point of the out of phase signals to be the same. The CMCC 30 accomplishes this by resisting change from a common mode voltage level by injecting current into a common mode ("CM") node between resistors R3 and R4, in combination with a pull up or pull down action on the delayed signal. The CMCC includes a high gain operational amplifier ("op-amp") generally indicated at 100. The CMCC 30 is comprised of elements X1, R7, R8, R9, R10, V5, an "npn" type transistor Q1 and a "pnp" type transistor Q2. The op-amp 100 includes a negative input ("inn") and a positive input ("inp"). The "inn" negative input is coupled to the node CM. A resistor divider generally indicated at 102 is coupled to the "inp" positive input. The resistor divider 102 includes resistors R7 and R8, which sets the DC voltage level at the "inp" positive input to be the same as the common mode voltage, computed as $V_{cm}=(Vp+Vn)/2$, where Vp is the voltage on T1, and Vn is the voltage on T2. By virtue of this circuit design, the voltage difference between the op amp's two inputs "inn" and "inp" is effectively zero, i.e., $V_{inn}-V_{inp}\approx 0$, if the op-amp's open loop gain is sufficiently large. Values of R9 and R10 are selected to provide a ratio of R9 to R10 that will adjust the closed loop gain of the op amp (X1) and the loading on the node CM. The output of the op-amp is connected to the base of both transistors Q1 and Q2 with a voltage threshold of $Vt_1$, $Vt_2$ respectively. The emitters of transistors Q1 and Q2 are connected to transmission line T1 at the P node, which has the greater delay of the differential pair T1, T2. The electrical currents through R10 and R9 are almost equal because the impedance of the op-amp is extremely high, with a value of $(V_{inp}-Vt)/R9\approx(V_{cmx}-V_{inp})/R10$ when $V_{inn}-V_{inp}\approx 0$, and the op-amp open-loop gain is sufficiently large. The values of R9 and R10 are preferably selected such that the electrical resistance of R9 is much greater than the electrical resistance of R10 (i.e., R9>>R10) to minimize the loading on the node CM. Thus, when the differential signal levels are equal and opposite, and in phase, the voltage at the CM node of the differential network 15 with the CMCC 30 attached settles very close to the voltage at the node CM without the CMCC 30 attached.

The op-amp's steady state output will settle to one transistor threshold drop below the voltage of the delayed signal (represented by the portion of a waveform 110 of FIG. 4, discussed below) that the output of the CMCC 30 is directly connected to. The size of the R10 and R9 establish the base voltage under steady state conditions. When the differential signals are phase shifted with respect to each other, as seen during a switching event, the CMCC will oppose the change in voltage at the CM node. When the leading transition in a first transmission line arrives before the transition in a second transmission line, the voltage on the CM node will attempt to deviate from the target common mode voltage. The DC voltage level at the op-amp "inp" input is intentionally set to match the target common mode voltage. The negative gain of the op-amp circuit will invert and amplify the initial change at node CM and cause the op-amp output to immediately rise or fall based on the Kirchoff voltage relation $V_{inp}-(R9/R10)*V_{cm}+V_p-Vt$. The positive going transition on the op-amp output will force the transistor Q1 to pull the low delayed signal 110 up (see FIG. 4). The negative going transition on the op-amp output will force transistor Q2 to pull the high delayed signal (represented by the portion of the waveform 110 in FIG. 5) down.

Figure 4:
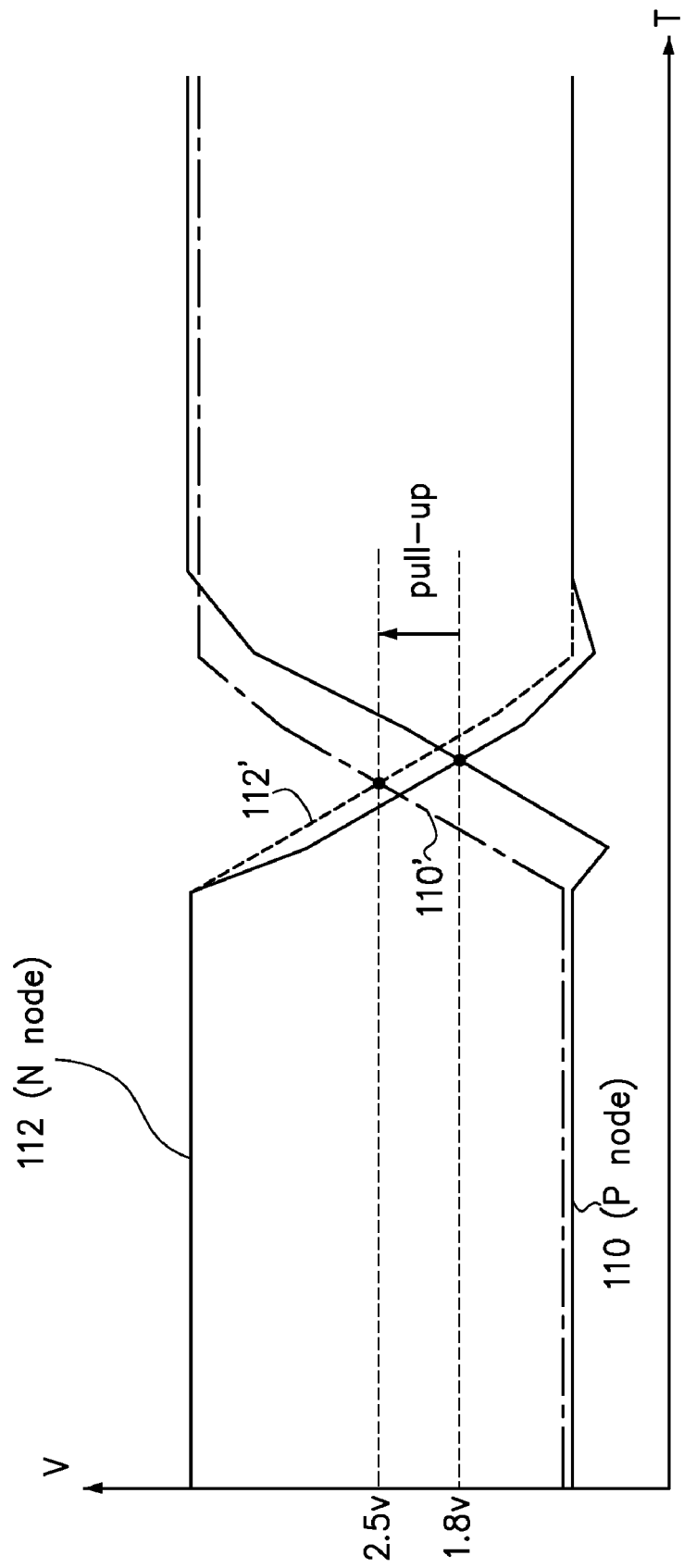
FIG. 4 is a graph comparing the differential signals with and without skew correction by the CMCC.

FIG. 4 is a graph of simulation-derived waveforms comparing the differential signals with and without skew correction by the CMCC. Solid lines are used to denote uncorrected signals 110, 112 representative of the circuit response that would ordinarily occur between components over a legacy backplane without using the CMCC. Broken lines are used to denote the corrected signals 110', 112' resulting from using the CMCC. The signals 110, 110' represent the uncorrected/corrected voltage at the P node (i.e. the "P" voltage signal). The signals 112, 112' represent the uncorrected/corrected voltage at the N node (i.e. the "N" voltage signal). The voltage level at the op-amp positive input "inp" (FIG. 3) is purposely defined to match the target common mode voltage, which is about 2.5V in this example. Without the use of the CMCC, the P voltage signal is delayed with respect to the N voltage signal. Due to this delay, a falling transition on the N voltage signal would ordinarily start before a rising transition on the P signal, and the N differential signal would reach the common mode voltage of 2.5V before the P differential signal and the voltage at the CM node would droop below the target common mode voltage, 2.5 volts, in this example. Without the use of the CMCC, the N differential signal and P differential signal would cross over below the common mode voltage and drop down to 1.825V in this example, as indicated by the intersection of the uncorrected signals 110, 112 (solid lines).

The corrected signals 110', 112' (dashed lines) show the restoration of the crossover voltage to the target common mode voltage by using the CMCC of FIG. 3. Referring again to the circuit diagram of FIG. 3, the negative gain of the op amp will amplify the negative change of the voltage, which has started to droop below the target common voltage level at the CM node, and a rising transition on the op-amp's output as defined by the Kirchoff voltage relationship $(V_{cm}-V_{inp})(-R9/R10)+Vp-Vt$ will be applied immediately to the transistor Q1's base. The positive going transition on the op-amp output will activate the transistor Q1 to pull up the "P" signal, and this action speeds up the transition of the delayed signal (waveform 110). In the present example, simulation shows that the cross over point changes to 2.519 volts from 1.825 volts. The transistor Q2 will be inactive before and during such a transition because the base emitter diode of the transistor Q2 is reverse biased. Whether transistor Q1 or Q2 is inactive during a switching event is determined by the relation of the voltage at the CM node to the voltage level on the signal 110. At the start of a switching event when the signal 110 is more negative than the voltage on the CM node, the base emitter junction of PNP (Q2) is the opposite polarity needed be forward biased. After the switching action, the output level of the op-amp will be one Q2 threshold drop below the steady state up level of the delayed "P" signal. The effect is to shift the signal 110 to the left to the corrected signal 110'. This has a corresponding "pull up" effect on the crossover point, so that the corrected signals 110', 112' cross over at the common mode voltage of 2.5V. This correction helps prevent misinterpreting the differential signal due to signal mismatch, so that the differential signal may be reliably interpreted.

Figure 5:
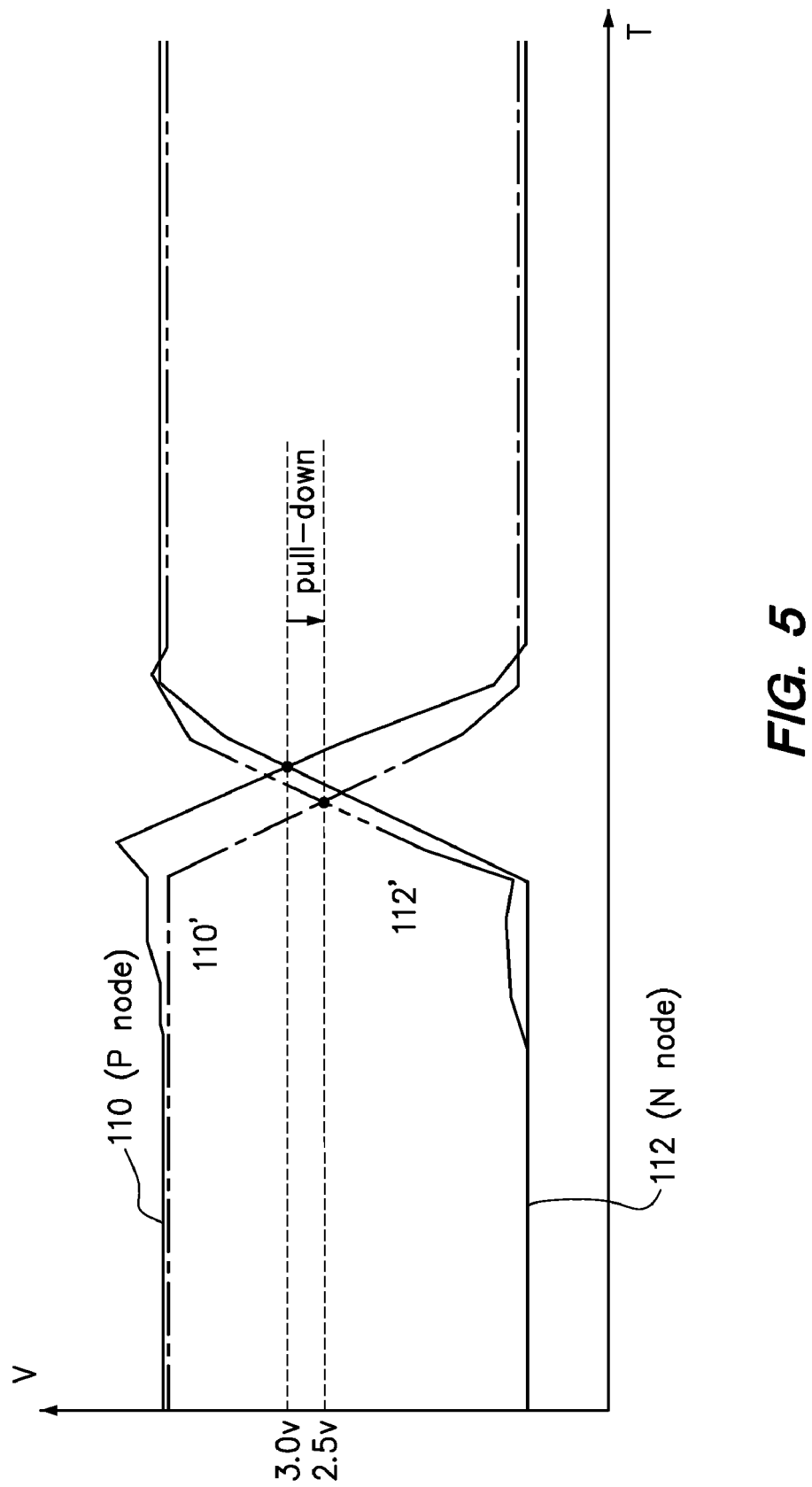
FIG. 5 is a graph illustrating the correction of skew in the case wherein a rising transition on the N differential signal arrives at the target common mode voltage before a falling transition on the P differential signal.

FIG. 5 is a graph illustrating the alternate case, illustrating the correction of skew in the case wherein a rising transition on the "N" voltage signal 112 instead arrives at the target common mode voltage before a falling transition on the "P" voltage signal 110. Referring again to the circuit diagram of FIG. 3, the negative gain of the op amp will amplify the positive going change in voltage at the CM node. Also, a falling transition on the op-amp output, which is based on the Kirchoff voltage relationship $(V_{cm}-V_{inp})(-R9/R10)+Vp-Vt$, will be applied to the base of the transistor Q2. The signal 110 is shifted to the left, resulting in the corrected signal 110'. Again, the correction offsets the greater delay that would otherwise occur in the positive signal 110 as compared to the negative signal 112, so that the two signals 110, 112 are in proper phase for interpretation by the receiver. As a result, the cross over voltage moved from 3.002 volts to 2.525 volts.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A differential signaling system, comprising:
    a pair of differential transmission lines of unequal length and having a common mode node between the differential transmission lines;
    an operational amplifier having a negative input coupled to the common mode node and a positive input coupled to a resistor divider that sets the DC voltage at the positive input equal to a voltage of the common mode node;
    a pair of transistors coupled to the output of the operational amplifier, with emitters of the transistors coupled only to the longer of the pair of differential transmission lines, wherein only one of the transistors is reverse-biased;
    a first resistor in series between the common mode node and the first differential negative input; and
    a second resistor in parallel with the operational amplifier, wherein the ratio of second resistor to the first resistor is less than an open-loop gain of the operational amplifier.

2. The differential signaling system of claim 1, wherein the differential transmission lines are included on a circuit board, and wherein the operational amplifier, the resistor divider, and the transistors are included in an application-specific integrated circuit externally coupled to the circuit board.

3. The differential signaling system of claim 1, wherein the differential transmission lines are included on a circuit board, the system further comprising:
    a first electronic component including a driver coupled to the circuit board for generating a differential signal on the differential transmission lines; and
    a second electronic component including a receiver coupled to the circuit board for receiving the differential signal.

4. The differential signaling system of claim 3, wherein the circuit board comprises a midplane or backplane of a multi-server chassis.

5. The differential signaling system of claim 4, wherein one or both of the first and second electronic components comprises a blade server.

6. A method, comprising:
    transmitting a differential signal over complementary signal paths of unequal length between a driver and a receiver; and
    resisting a change in crossover voltage of the differential signal at a common mode node between the complementary signal paths near the receiver by automatically injecting electrical current only into the longer of the complementary signal paths;
    detecting a common mode voltage change from a steady state level; and
    adjusting the gain of an operational amplifier and the magnitude of a resistor divider at a differential input to the operational amplifier to establish op-amp input levels.

7. The method of claim 6, further comprising:
    performing a pull up action on the differential signal component transmitted on the longer signal path during a rising voltage transition.

8. The method of claim 6, further comprising:
    increasing voltage or current at the common mode node in response to a rising voltage transition on the longer signal path.

9. The method of claim 6, further comprising:
    performing a pull down action on the differential signal component transmitted on the longer signal path during a falling voltage transition.

10. The method of claim 6, further comprising:
    decreasing voltage or current at the common mode node in response to a falling voltage transition on the longer signal path.

* * * * *